Aug. 16, 1966      J. J. SHIVELY      3,266,315
WEATHER EFFECT INDICATORS
Filed March 12, 1963      3 Sheets-Sheet 1
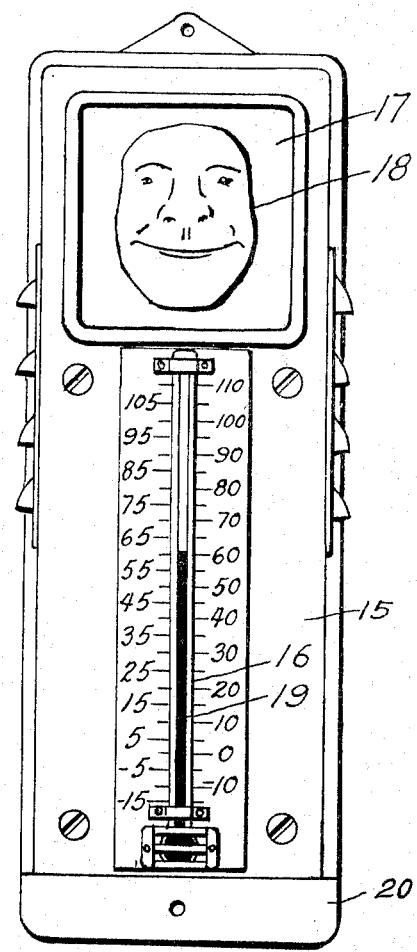
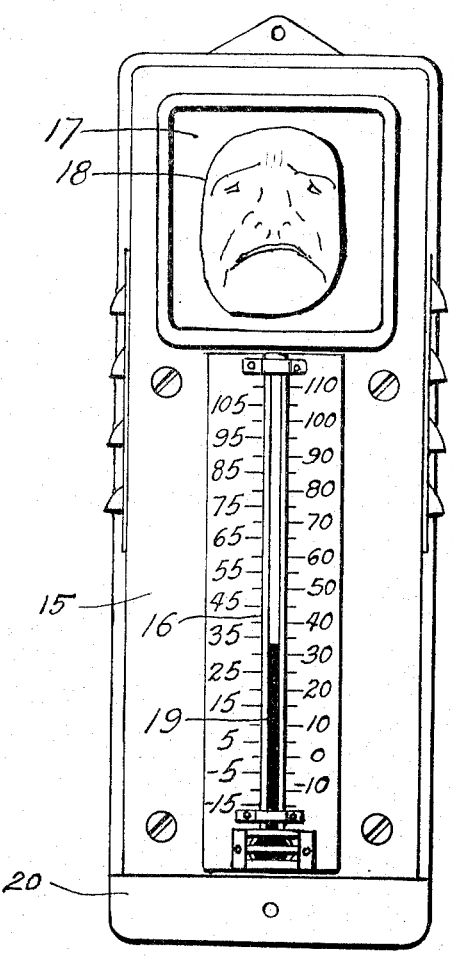
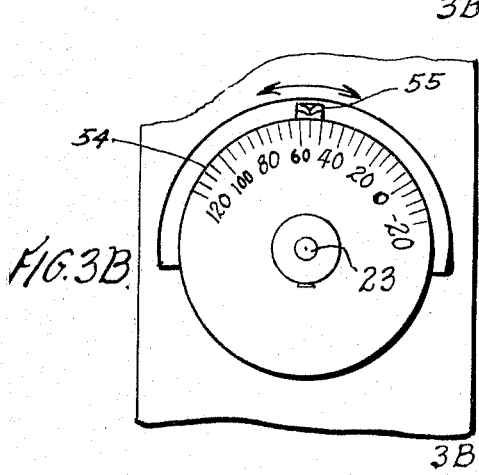
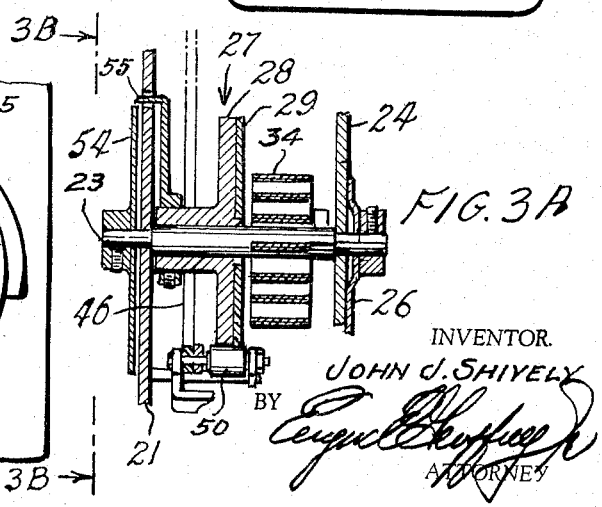
INVENTOR.
JOHN J. SHIVELY
BY
ATTORNEY Aug. 16, 1966 J. J. SHIVELY 3,266,315
WEATHER EFFECT INDICATORS
Filed March 12, 1963 3 Sheets-Sheet 2
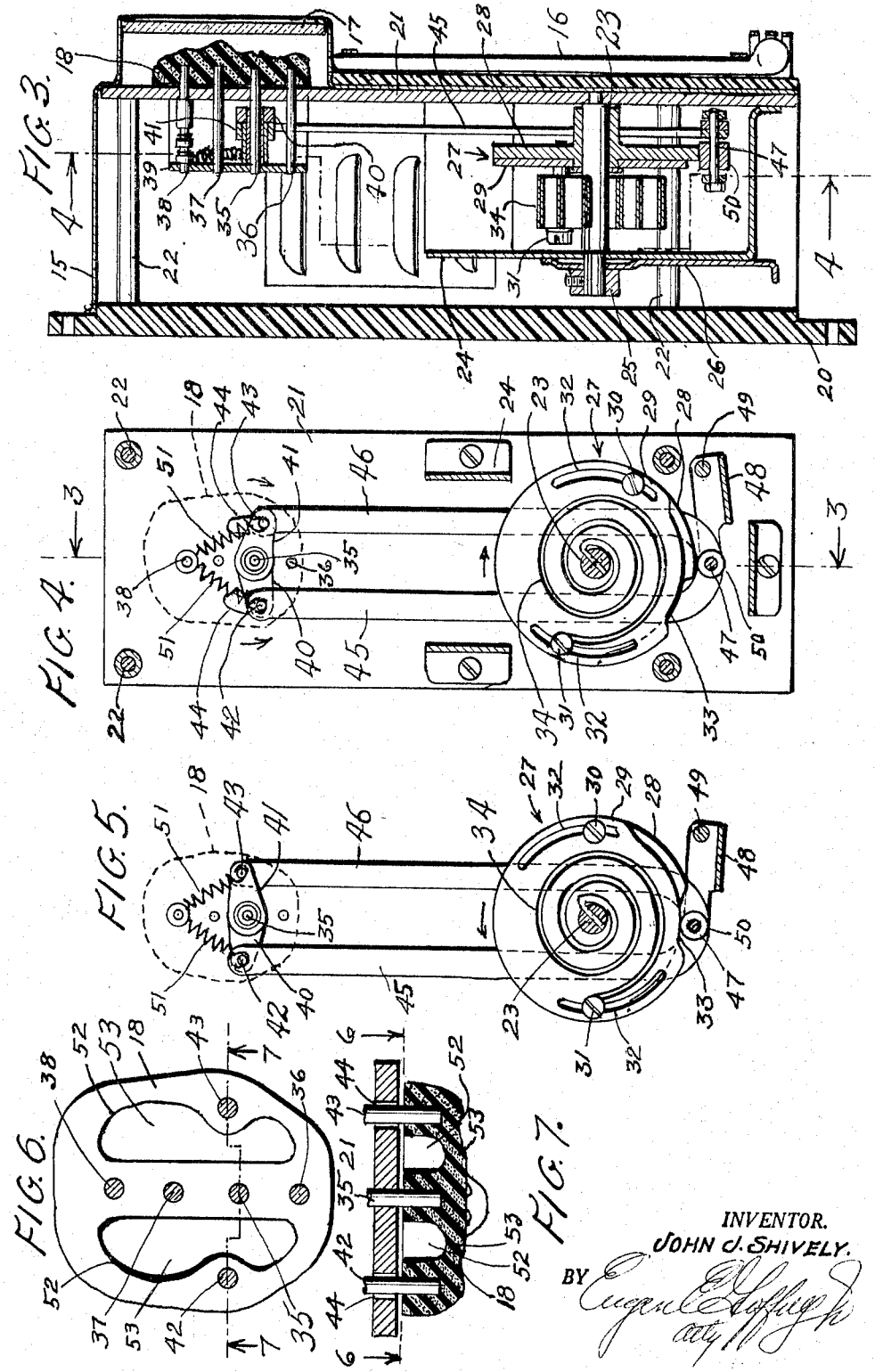
INVENTOR.
JOHN J. SHIVELY.
BY [signature]
atty Aug. 16, 1966  J. J. SHIVELY  3,266,315
WEATHER EFFECT INDICATORS
Filed March 12, 1963  3 Sheets-Sheet 3
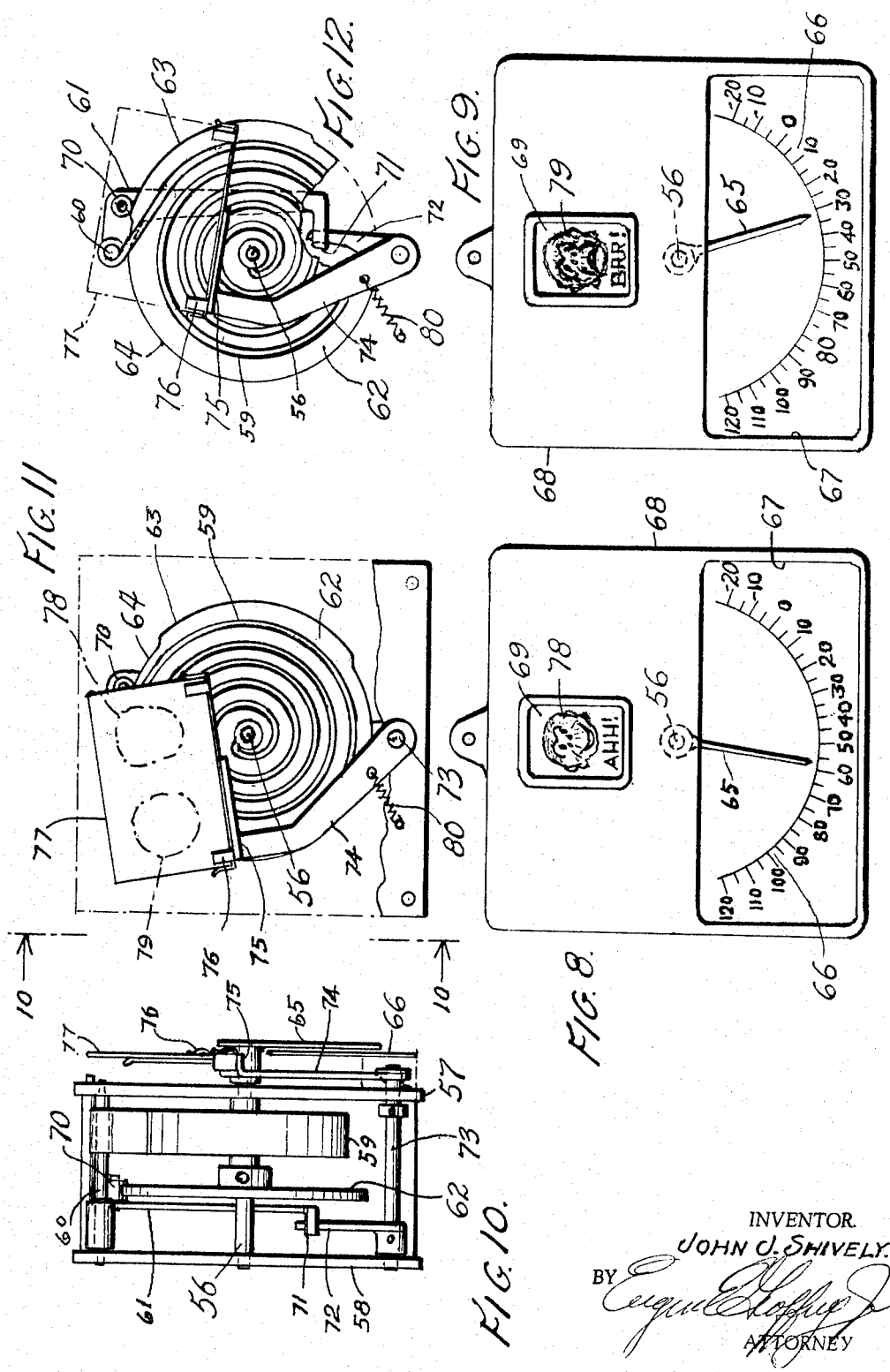
INVENTOR.
JOHN J. SHIVELY.
BY
ATTORNEY

United States Patent Office 3,266,315
Patented August 16, 1966

3,266,315
WEATHER EFFECT INDICATORS
John J. Shively, 515 E. 89th St., New York, N.Y.
Filed Mar. 12, 1963, Ser. No. 264,646
4 Claims. (Cl. 73—362.1)

The present invention pertains to improvements in weather effect indicators.

An object of the invention is to provide means to indicate the physical effects on living beings of varying atmospheric conditions, either outdoor or indoor.

A further object is to provide means automatically operable to indicate changes between pre-determined temperature range zones by simulating visually the natural reactions of humans or animals to said changes.

A further object is to provide a thermometric instrument including a scale thermometer and means movable in response to temperature changes to simulate characteristic natural reactions of humans or animals to the temperature conditions indicated by the thermometer.

A further object is to provide a device of the above type including means operable in conjunction with the thermometer for adjusting the range relation between the simulating means movements and the indicated temperatures.

A further object is to provide a facial image and means responsive to temperature changes for changing the facial expression of the image.

Other objects and advantages of the invention will become evident during the course of the following description in connection with the accompanying drawings, in which:

FIGURE 1 is a front view of one form of the device indicating pleasant temperature conditions;

FIGURE 2 is a similar view illustrating the effect of unpleasant temperature conditions;

FIGURE 3 is a vertical sectional profile view of the device shown in FIGS. 1 and 2 illustrating the internal operating mechanism;

FIGURE 3-A is a fragmental vertical section illustrating a modification of the thermometric apparatus;

FIGURE 3-B is a front view of the same;

FIGURE 4 is a rear view of the operating mechanism in position corresponding to the showing of FIG. 2;

FIGURE 5 similarly illustrates the position of the mechanism corresponding to FIG. 1;

FIGURE 6 is an enlarged rear view of a typical facial mask for use in the device;

FIGURE 7 is a cross sectional view of the mask in the plane 7—7, FIG. 6;

FIGURE 8 is a front elevation of an alternative form of the device, indicating pleasant weather conditions;

FIGURE 9 is a similar view indicating unpleasant weather;

FIGURE 10 is a side view of the device, FIGS. 8 and 9, with the casing removed;

FIGURE 11 is a detail front view of the image changing mechanism in the "good weather" position corresponding to FIG. 8, and FIGURE 12 is a similar view corresponding to FIG. 9.

Referring to FIGS. 1 and 2, the numeral 15 denotes a casing on which is mounted an indicating thermometer 16. Above the thermometer is a window or transparent panel 17 behind which is disposed a flexible mask 18, the mask in the present example being fashioned to represent a human face. It will be noted that in FIG. 1 the mask 18 exhibits an expression of pleasure or approval, while the liquid column 19 of thermometer 16 indicates a temperature of 65 degrees F. It will further be noted that in FIG. 2, wherein the indicated temperature has dropped to near freezing, the mask has assumed an expression of disapproval or discomfort. The means by which this and related changes in facial expression are effected in response to temperature changes are shown in FIGS. 3, 4 and 5.

In FIG. 3, the numeral 20 indicates a wall bracket to which a front plate 21 is secured in forwardly spaced relation on screw and sleeve posts 22, the casing 15 in turn being secured to the plate 21. A horizontal shaft 23 is journalled at front and rear respectively in the plate 21 and a spider bracket 24. A hub 25, secured on the inner end of the shaft 23, has attached thereto a downwardly extending adjusting lever 26 of slightly flexible metal which presses against the rear face of the bracket 24, thereby providing a holding friction which serves to retain the lever and attached shaft 23 in any desired adjusted position. A composite cam 27, composed of a hubbed main disk 28 and a rear disk 29 secured thereto, is rotatably mounted on the shaft 23. The rear disk 29 is clamped to the main disk by means of screws 30 and 31 as shown in FIGS. 4 and 5, the rear disk being provided with arcuate slots 32 which permit circumferential adjustment of the two disks with respect to each other. The two disks are of identical profile, each having an arcuate peripheral depression so oriented that when the disks are assembled the two depressions overlap to form a common notch 33 in the composite cam 27. By varying the circular setting of the disks with respect to each other, as noted above, the arcuate extent of the notch 33 may be adjusted for a purpose hereinafter set forth.

The clamping screw 31 is of the long shouldered type so as to form in effect a crank pin fixed to the cam 27. A bimetallic spiral 34, of the general type employed in thermostats and other temperature responsive devices, has its inner end fixed to the shaft 23 while its outer end terminates in a loop or eye embracing the shoulder screw 31. Thus under changing temperature conditions the rotary expansion or contraction of the spiral 34 is adapted to rotate the cam 27 in one direction or the other on the shaft 23. While for clarity in illustration the spiral or bimetallic element 34 is shown with a small number of turns, it will be understood that this is representative of any desired number employed in practice to produce the rotational effects to be described.

Four small pins 35, 36, 37 and 38, fixed in the front plate 21 and braced at their rear ends by a bracket 39, protrude forwardly beyond the plate 21 to serve as retainers for the mask 18 as shown in FIG. 3. Two short rocker arms 40 and 41, rockably mounted on the pin 35 and extending laterally therefrom in opposite directions, have fixed in their outer ends pins 42 and 43 which extend forward through arcuate slots 44 in the plate 21. Vertical links 45 and 46 respectively connect the rocker pins 42 and 43 with a hinge pin 47 carried by a small yoke 48, the latter being rockably mounted on a stationary dowel 49 secured to the plate 21 near the lower end of the device. The lower hinge pin 47 also carries a roller 50 of sufficient length to span both plates of the cam 27, FIG. 4. A pair of tension springs 51, linking the rocker pins 42 and 43 to the upper stationary pin 38, urge the rockers upward, and thereby resiliently hold the roller 50 in follower contact with the cam 27.

A typical form of the mask 18 is formed of resilient material such as foam rubber or other suitable plastic, the rear of the mask being provided with sockets adapted to receive the stationary pins 35–38 and the rocker pins 42–43 when it is pressed thereon as illustrated in FIGS. 6 and 7. Cavities 52 in the rear surface of the mask provide thin front walls 53 and hence increased flexibility in the regions between the portions engaging the stationary and the movable pins.

A typical operation is as follows, assuming for illustration that the temperature is 65 degrees F., and this temperature being normally considered pleasant, the previously described bimetallic motor mechanism has been adjusted by means of the lever 26 so that the roller 50 lies within the cam notch 33 as shown in FIG. 5. Under these circumstances the pins 42 and 43, drawn upward by the springs 51, have flexed the side zones of the mask 18 upward so that the mask has assumed the appearance of a smile, as shown in FIG. 1., thus simulating a visual expression of natural reaction to the pleasant temperature as presumedly shared by the device and the observer.

So long as the temperature is such that the roller 50 remains in the cam notch 33, it is evident that the mask 18 retains the expression of well-being as shown in FIG. 1. However, in case of a temperature drop to what is normally regarded as an uncomfortable degree, for example to about 34 degrees F. as indicated in FIG. 2, the accompanying counter-clockwise rotation of the cam 27 by the bimetallic spiral 34 forces the roller 50 downward out of the notch as shown in FIG. 4, rocking the pins 42 and 43 downward. Since the middle pins 35, etc., are stationary, the downward movements of the side pins flex the mask 18 so as to present the lugubrious expression shown in FIG. 2 and indicative of discomfort at the near freezing temperature revealed by the thermometer 16.

Similarly, in case of the temperature rise to an uncomfortably high condition the bimetallic member 34 rotates the cam 27 clockwise from the position shown in FIG. 5, thereby forcing the roller 50 out at the left-hand slope of the notch 33 and flexing the mask 18 in the manner previously described to express discomfort, in this instance at an indicated extreme of heat. From the foregoing it will be evident that so long as the temperature remains within a "pleasant" range the expression of the mask 18 remains cheerful, but a departure from this range in either direction is automatically indicated by a characteristic expression of discomfort or disgust.

In a typical use, for example outside a window but visible therethrough, the user may ascertain at a glance whether he may expect comfortable or uncomfortable conditions if he ventures forth and may govern himself accordingly, without any necessity for close reading of the exact thermometric temperature, though obviously he may also carry out such reading if he so desires. It will be understood, however, that the use of the device is not confined to outdoor weather, since with proper settings it of course may similarly be employed to check the indoor weather provided by heating and/or air conditioning systems and the like. In addition to such features of direct utility, the device in its changes of expression in general agreement with the presumed feelings of the observer, may present beneficial psychological effects to the latter, such as amusement, together with a degree of comfort in bad weather by simulated comradeship under the well established principle that "misery loves company."

Obviously, different persons have differing feelings as to the extent or spread of their preferred "comfort zones," as well as to the particular locations of the said zones in the temperature scale. In the embodiment of the invention as just described, the extent of the comfort zone may be set in accordance with the particular taste of the user by adjusting the mutual relationship of the cam disks 28 and 29 to determine the extent of the notch 33 as previously described, while the location of the comfort zone may similarly be set by adjusting the lever 26 to fix the operational range in any desired relation to the temperature indications of the thermometer 16.

FIGS. 3-A and 3-B illustrate a modification of the device described in which the bimetallic spiral 34, in addition to operating the expression-changing apparatus, also acts as the scalar thermometer. For this purpose an arcuate dial 54 is secured to the shaft 23, while a pointer 55 is adjustably mounted on the hub of the cam 27 so as to cooperate with the dial. The relationship of the dial and pointer having been initially set to provide accurate temperature indication, adjustment of the "comfort zone" to any desired point by means of the lever 26 does not disturb such accuracy, since the dial 54 and the related mechanism are rotated bodily with the shaft 23. Except for the rotary, instead of linear, scalar temperature indication, the operation of the device is the same as previously described.

FIGS. 8–12 illustrate an embodiment of the invention employing pictorial means to provide the simulated reaction to weather changes. In a typical form the device includes a shaft 56, rotatably mounted in spaced front and rear plates 57 and 58. In this case the bimetallic spiral 59 has its stationary anchorage on a rod 60 supported in the plates 57 and 58 and also serving to pivotally hold a hubbed lever 61. The spiral 59 is also terminally secured to the shaft 56, so that changes in temperature serve to rotate the shaft in the well-known thermo-responsive manner. A cam 62, characterized by radially greater and lesser peripheral zones 63 and 64 respectively, is adjustably secured on the shaft 56. The shaft 56 also adjustably carries a pointer 65 cooperative with a temperature dial 66 visible through an opening 67 in the detachable casing 68 of the instrument, FIGS. 8 and 9. The casing 68 also has an upper window 69.

The previously noted lever 61 carries a roller 70 engaging the cam 62, and also has a lower terminal hook 71 engaging a short lever 72 adjustably secured on a rocker spindle 73. An angular arm 74, secured to the front end of the spindle 73, has its upper end formed as a bracket 75 to which is fastened a card clamp 76 adapted to receive and to resiliently hold an image card 77, carrying related images 78 and 79. In the example illustrated, gravity serves to hold the apparatus in the position shown in FIG. 11, but a spring 80 may be included in order to assure operation in case the device is employed in other than normal position.

In the simplified embodiment illustrated the device is so set that when the temperature is in the pleasant range the roller 70 bears on the radially lesser portion 64 of the cam 62, so that the bracket 75 holds the card 77 with the image 78 in registry with the window 69, FIGS. 11 and 8. When the temperature drops to the predetermined zone, rotation of the cam 62 raises the roller 70 to swing the lever 61 counter-clockwise, FIG. 12, thereby swinging the front bracket lever 74 clockwise to bring the second image 79 into view.

While the related images 78 and 79 may depict any desired type of countenance or object, for purposes of the present illustration they represent a monkey, preferably of brass, who appears cheerful in the balmy temperature of FIG. 8 but who in FIG. 9 expresses the legendary anguish inflicted on such primates by sufficient degrees of cold.

Since the card 77 is readily removable from the bracket clamp 76, obviously the user may be furnished with any number of differing image cards which may be interchanged in the device at any time, the casing 68 simply being removed while the change is made. As a further feature, blank cards 77 may be provided on which the owner may draw or paint any desired images within the limits of his artistic skill.

With regard to interchangeability of images, it will be noted that the same feature is applicable to the form of the device illustrated in FIGS. 1 and 2, different forms of the mask 18 being selectively made usable in the device simply by slipping them out of and into place on the various retaining pins 35, etc., FIGS. 6 and 7. It will furthermore be evident that if desired a liquid thermometer may be employed with the type of shifting mechanism shown in FIG. 11, and that similarly this type of mechanism may embody the notched or compound form of cam shown in FIG. 5. Other related forms, such as joint control by thermometer and hygrometer via servo, may similarly be provided, and if desired in some cases, a bellows type of actuator may be substituted for the bimetallic motor.

Thus, while the device has been set forth in preferred form, it is not limited to the precise embodiments illustrated, as various modifications may be made without departing from the spirit of the invention within the scope of the appended claims.

What is claimed is:

1. In an indicating device, in combination, a support, a simulated face mask of flexible material on said support, and thermally responsive means mounted on said support in operative connection with said mask and adapted to flex said mask to differing simulated facial expressions in response to pre-selected changes in temperature affecting said thermally responsive means.

2. In an indicating device, in combination, supporting means, a simulated face mask of flexible material on said supporting means, a bimetallic actuator on said supporting means, and means operationally connecting said actuator to said mask for flexing said mask to differing simulated facial expressions in response to temperature changes affecting said bimetallic actuator.

3. In an indicating device, in combination, a support, a simulated face mask of flexible material removably mounted on said support, a temperature-responsive bimetallic spiral member on said support, a cam connected to said spiral member and rotatable thereby in response to temperature changes, a follower operable by said cam in response to a pre-determined active angular rotation of said cam, means operatively connecting said follower to said mask whereby said mask may be flexed for changing the simulated facial expression thereof by said operation of said follower, an indicating thermometer on said support including a scale, and adjusting means to correlate said active angular rotation of said cam with a selected zone of temperature indication on said scale.

4. A device according to claim 3 wherein said cam has a peripheral notch adapted to be engaged by said follower, and wherein said cam includes adjusting means to vary the peripheral angular extent of said notch.

References Cited by the Examiner
UNITED STATES PATENTS

| | | | |
|---|---|---|---|
| 1,598,497 | 8/1926 | Oswald | 40—106.32 |
| 1,695,827 | 12/1928 | Sipe | 116—114 |
| 1,753,003 | 4/1930 | Folberth et al. | 73—339 X |
| 2,790,323 | 4/1957 | Morsch | 73—362.2 X |

LOUIS R. PRINCE, *Primary Examiner.*

ISAAC LISANN, *Examiner.*

D. M. YASICH, *Assistant Examiner.*